United States Patent [19]

Watanabe et al.

[11] Patent Number: 5,766,787
[45] Date of Patent: Jun. 16, 1998

[54] SOLID POLYMER ELECTROLYTE COMPOSITION

[75] Inventors: Masahiro Watanabe; Hiroyuki Uchida, both of Yamanashi, Japan

[73] Assignees: Tanaka Kikinzoku Kogyo K.K.; Masahiro Watanabe, both of Japan

[21] Appl. No.: 516,395

[22] Filed: Aug. 17, 1995

Related U.S. Application Data

[63] Continuation-in-part of Ser. No. 261,636, Jun. 17, 1994, abandoned.

[30] Foreign Application Priority Data

| Jun. 18, 1993 | [JP] | Japan | 5-172683 |
| Mar. 31, 1994 | [JP] | Japan | 6-85805 |

[51] Int. Cl.⁶ ............................................. H01M 8/10
[52] U.S. Cl. ..................... 429/33; 429/30; 429/190; 429/192; 429/193; 521/27; 204/421; 204/296; 252/62.2
[58] Field of Search ...................... 204/421, 282, 204/252, 296; 429/30, 33, 190, 192, 193; 521/27; 252/62.2

[56] References Cited

U.S. PATENT DOCUMENTS

| 4,604,170 | 8/1986 | Miyake et al. | 204/296 |
| 5,045,171 | 9/1991 | MacDonald | 204/296 |
| 5,164,060 | 11/1992 | Eisman et al. | 204/282 |
| 5,262,250 | 11/1993 | Watanabe | 429/33 |
| 5,302,269 | 4/1994 | Eisman et al. | 204/252 |
| 5,380,413 | 1/1995 | Posar et al. | 204/182.4 |
| 5,472,799 | 12/1995 | Watanabe | 429/30 |

OTHER PUBLICATIONS

Watanabe, et al. (1993) J. Electrochem. Soc. 140:3191.

*Primary Examiner*—Bruce F. Bell
*Attorney, Agent, or Firm*—Klauber & Jackson

[57] ABSTRACT

Disclosed herein is solid polymer electrolyte composition comprising solid polymer electrolyte and at least one metal catalyst selected from the group consisting of platinum, gold, palladium, rhodium, iridium and ruthenium contained in the said solid polymer electrolyte. The said composition may further contain a metal oxide. The membrane made of the composition possesses the abilities of producing water by itself and of retaining the water so that the ionic conductivity and the effect of depressing the crossover is excellent. Accordingly, the cell employing the membrane possesses superior cell performance.

10 Claims, 8 Drawing Sheets

SOLID POLYMER ELECTROLYTE COMPOSITION

CROSS-REFERENCE TO RELATED APPLICATION this application is a continuation-in-part of application Ser. No. 08/261,636 filed Jun. 17, 1994 and abandoned Oct. 4, 1995.

BACKGROUND OF THE INVENTION

This invention relates to solid polymer electrolyte composition excellent in ionic conductivity and the effect of depressing crossover.

As conventional solid polymer electrolyte, such cation exchange resin as perfluorocarbon sulphonic acid, polysulphone, perfluorocarboxylic acid, styrene-vinyl benzene sulphonic acid and such anion exchange resin as styrene-butadiene based resin are known. Especially, the perfluorocarbon sulphonic acid is fluorinated resin developed by Du Pont which is known as Nafion (tradename). The Nafion which may function as solid polymer electrolyte is attracting attention because of its excellent chemical stability and thermal stability. The Nafion is basically a copolymer of tetrafluoroethylene and perfluorovinylether having a sulphonic group.

Among the above solid polymer electrolytes, the granular electrolyte is packed in a column and employed for the manufacture of pure water and the like. The solid polymer electrolyte molded to a thin film is employed as an ion exchange membrane of various electrochemical cells.

The solid polymer electrolyte electrochemical cell converts chemical energy into electric energy. In case of a fuel cell, for example, such a fuel as a hydrogen gas and methanol and such an oxidant as an oxygen gas and hydrogen peroxide are supplied to an anode and a cathode, respectively, and a current produced in an electron transfer reaction on the anode or the cathode flows in the solid polymer electrolyte membrane (ion exchange membrane). The flow of the current is produced by the movement of a cation from the anode to the cathode and of an anion from the cathode to the anode. The movement of the ions is said to occur by the presence of water in a three-dimensional network layer formed by the ion exchange groups. If, however, the solid polymer electrolyte membrane is dried, the electric resistance of the membrane, in other words, the specific resistance is increased to remarkably lower the ionic conductivity. Since, accordingly, the specific resistance becomes small with the wetting of the membrane, the lowering of the specific resistance decreases the energy loss when a current flows in the solid polymer electrolyte membrane to provide a solid polymer electrolyte fuel cell with high performance. The solid polymer electrolyte membrane sufficiently humidified can prevent the leakage of a hydrogen gas supplied to the anode and an oxygen gas supplied to the cathode passing through the solid polymer electrolyte membrane as they are. In other words, can prevent the crossover.

In order to elevate the ionic conductivity of the solid polymer electrolyte membrane by preventing the drying of the said membrane and by depressing the crossover, the humidity control for sufficiently humidifying the membrane is important.

One of the most important characteristics of a polymer electrolyte membrane (PEM) is its ionic conductivity. A high level of ionic conductivity generally results in a high energy output which obviously is an important parameter for fuel cells containing such membranes (such fuel cells are hereinafter referred to as "PEFCs"). In order to obtain a high output, the membrane is desirably maintained in a humidified condition. As discussed below, several prior art methods exist for attaining such condition. The most effective method for humidifying the membrane in order to achieve a high output is to supply liquid water thereto directly. However, this method has not yet been accepted practically due to the difficulty of the PEM preparation.

The most suitable method for achieving humidification of the membrane has appeared, so far, to be on which involves supplying humidified air (or other oxygen-containing gas) and/or humidified hydrogen which may be prepared by bubbling the gas through water at a temperature higher than that of PEFC operation, e.g. 80° to 90° C. Although such method results in the highest theoretical level of energy output, the net energy derivable from the fuel cell is considerably reduced by virtue of the not-inconsequential energy required to generate vapor. If the humidification temperature could be lowered, e.g. to room temperature, the net energy can be improved. However, for membranes employed in conventional fuel cells, a satisfactory output cannot be achieved by employing a gas humidified at room temperature, further, membranes employed in conventional fuel cells have an insufficient level of water-retention capability and therefore cannot make effective use of the humidity contained in the gas.

For achieving this humidity control, an indirect method in which the membrane is indirectly humidified by a hydrogen gas supplied to the anode which has been saturated with steam, and a direct method in which the membrane is directly humidified through the hygroscopic twisted fibers being sandwiched in between the membranes have been conventionally proposed.

However, the indirect method has the drawback that the performance may be lowered because the sufficient control of the steam pressure which changes following the change of the load of the electrochemical cell cannot be conducted so that the membrane is liable to be dried or the catalyst layer is excessively humidified. Since a large amount of the steam is supplied to the hydrogen gas so that the hydrogen gas is diluted and its partial pressure is decreased, the pressurized operation is required and the diffusion of the hydrogen gas in the electrode catalyst is prevented to disadvantageously lower the cell performance. As a measure of overcoming this disadvantage, it is proposed to make the membrane thickness thinner to lower the specific resistance of the membrane itself so as to decrease the amount of humidification. When, however, the membrane thickness is made thinner, the above crossover is likely to occur to disadvantageously lower its cell voltage.

Although, on the other hand, in the direct humidification method, the humidification can be achieved in the sandwich structure employing the twisted fibers which are sandwiched in between the solid polymer electrolyte membranes, the total membrane thickness is increased by the thickness of the fibers to lower the ionic conductivity so that the said approach hardly becomes a fundamental solution.

Accordingly, the conventional humidity control is accompanied with several drawbacks and is not satisfactory.

SUMMARY OF THE INVENTION

The present invention has been made to overcome the above drawbacks.

Accordingly, an object of the present invention is to provide solid polymer electrolyte composition which may be employed in an electrochemical cell.

Another object of the invention is to provide solid polymer electrolyte composition which may improve the ionic conductivity of the electrochemical cell by decreasing the specific resistance of the ion exchange membrane.

A further object of the invention is to provide solid polymer electrolyte composition which may have an excellent function of preventing the crossover.

A first invention relates to improved solid polymer electrolyte which may be employed, for example, as a membrane of a solid polymer electrolyte fuel cell and is excellent in ion conductivity and in the effect of depressing the crossover which may be produced by means of the ability of forming water by itself. The solid polymer electrolyte composition comprises solid polymer electrolyte selected from cation exchange resin such as perfluorocarbon sulphonic acid, polysulphone, perfluorocarboxylic acid, styrene-vinyl benzene sulphonic acid and anion exchange resin such as styrene-butadiene, and 0.01 to 80% in weight of at least one metal catalyst selected from platinum, gold, palladium, rhodium, iridium and ruthenium based on the weight of the solid polymer electrolyte contained in the solid polymer electrolyte.

A second invention relates to further improved solid polymer electrolyte which may be employed, for example, as a membrane of a solid polymer electrolyte fuel cell and is excellent in ion conductivity and in the effect of depressing the crossover which may be produced by the ability of holding water in addition of forming water by itself. The solid polymer electrolyte composition comprises solid polymer electrolyte selected from the cation exchange resin and the anion exchange resin, 0.01 to 80% in weight of at least one metal catalyst selected from platinum, gold, palladium, rhodium, iridium and ruthenium based on the weight of the solid polymer electrolyte, and 0.01 to 50% in weight of particles and/or fibers of at least one metal oxide based on the weight of the solid polymer electrolyte contained in the solid polymer electrolyte. The metal oxide contained in the solid polymer electrolyte includes silica ($SiO_2$), titania ($TiO_2$), alumina ($Al_2O_3$), zirconia ($Zr_2O_3$), magnesia ($MgO$) and stannic oxide ($SnO_3$), and among them the silica and the titania are desirably employed.

As a result of various investigations concerning the improvement of the solid polymer electrolyte excellent in the ionic conductivity and the crossover depressing effect, the present inventors have found that the above solid polymer electrolyte composition comprising the ion exchange resin and the metal catalyst has the ability of forming water by itself which improves the ionic conductivity by humidifying the solid polymer electrolyte and depress the crossover.

When the membrane is molded by the solid polymer electrolyte composition comprising the solid polymer electrolyte and the catalyst metal contained therein and is employed as the solid polymer electrolyte membrane (ion exchange membrane) of the solid polymer electrolyte electrochemical cell, a hydrogen gas or methanol and an oxygen gas or hydrogen peroxide react with each other in the above membrane to form water. In this manner, the solid polymer electrolyte membrane made by the composition of the present invention can humidify the said membrane by forming water by itself inversely utilizing the hydrogen gas and the oxygen gas in the crossover condition. Since the humidification from the outside can be reduced or omitted in the above situation, the lowering of the cell performance due to the humidification from the outside can be depressed and the non-humidification operation can be conducted. Since such a fuel as a hydrogen gas and such an oxidant as an oxygen gas never flow to the respective counterelectrodes by the depression of the crossover, the lowering of the cell voltage can be prevented and the ionic conductivity can be improved by making the membrane thickness thinner to decrease the specific resistance of the solid polymer electrolyte membrane itself.

When 0.01 to 50% in weight of the particles and/or the fibers of such a metal oxide as the silica and the titania based on the weight of the solid polymer electrolyte are incorporated in the solid polymer electrolyte containing the metal catalyst, the ability of retaining the water produced in the solid polymer electrolyte is elevated. Since, in this manner, the water produced is effectively retained, the drying of the membrane is depressed, the ionic conductivity is further improved and the effect of depressing the crossover is further elevated.

When the above solid polymer electrolyte composition is employed as the solid polymer electrolyte membrane (ion exchange membrane) of a solid polymer electrolyte electrochemical cell such as a fuel cell, the membrane may possess not only the ability of forming water by itself but also the ability of retaining the water so that the solid polymer electrolyte electrochemical cell having the excellent performance and the following effects can be obtained.

① Since the membrane has the abilities of forming water by itself and of retaining the water, an amount of humidity supplied from the outside may be reduced. In this manner, the lowering of the cell performance due to the supply of the large amount of the humidity can be depressed.

② Since the operation temperature can be made lower because of the reduction of the amount of the humidity from the outside, the efficiency of producing the output electricity can be increased and the period of the startup at the initial operation may be reduced.

③ If a small amount of a fuel gas or liquid and an oxidative gas or liquid are supplied to the solid polymer electrolyte membrane at the time of operation suspension, the metal catalyst of the membrane produces water which is retained in the metal oxide such as silica and titania. Since, in this manner, the solid polymer electrolyte membrane is never dried, the prompt rising of the current density at the time of initial operation can be achieved.

④ Since the solid polymer electrolyte membrane possesses the abilities of forming water by itself and of retaining the water, the operation under non-humidification can be conducted.

⑤ Since the crossover is depressed, the fuel gas or liquid and the oxidative gas or liquid do not flow to the respective counterelectrodes so that the lowering of the cell voltage can be prevented.

⑥ Since the crossover is depressed, the thickness of the membrane may be made thinner to reduce the resistance of the membrane so that the ionic conduction can be accelerated.

BRIEF DESCRIPTION OF THE DRAWINGS

FIG. 6 is a graph which compares the resistances of various PEMs in PEFCs operated at 80° C. without any humidification (shown by the symbols $\triangle$, $\square$, $\diamond$, $\nabla$, $\circ$) and with external humidification (shown by the symbols $\oplus$ at $T_n=20°$ C.; $\blacktriangle$, $\blacktriangledown$, $\bullet$ at $T_n=90°$ C.). The symbol "TIP" is used to denote titanium isopropoxide used to prepare $TiO_2$ colloid by hydrolysis of the TIP: "P25" represents Aerosol P25 used as a source of $TiO_2$. Gas flow rates were controlled so as to maintain constant utilization of $H_2$ at 20% and $O_2$ at various current densities. The symbols $\triangle$, $\blacktriangle$ represent a normal-PEM; $\square$ represents a $TiO_2$ (TIP)-PEM; $\diamond$ represents a Pt-PEM, $\nabla$, $\blacktriangledown$ represent a Pt-$TiO_2$(P25)-PEM; $\circ$, $\oplus$, $\bullet$ represent a Pt-$TiO_2$ (TIP)-PEM.

DETAILED DESCRIPTION OF THE INVENTION

As mentioned, the content of the metal catalyst contained in the solid polymer electrolyte in a highly dispersed state is 0.01 to 80% in weight, and preferably 0.1 to 16% in weight of the weight of the solid polymer electrolyte. The average particle size of the metal catalyst is not more than 0.1 μm, and preferably not more than 0.01 μm. This is because the effect of depressing the crossover is elevated when the dispersion of the metal catalyst in the electrolyte is increased with the decrease of the average particle diameter, and further an amount of the catalyst contained may be reduced.

The particles of the metal oxide contained in the electrolyte in the highly dispersed state may have an amorphous crystalline structure, and their average primary particle diameter is not more than 0.1 μm, and desirably not more than 0.01 μm. The metal oxide preferably possesses high purity and a high specific surface area (not less than 130 $m^2/g$ measured in accordance with the BET method). The diameter of the fibers is preferably not more than 5 μm. This is because in case of the particles having the average primary particle diameter of more than 0.1 μm and/or the fibers having the diameter of more than 5 μm, the effect of lowering the specific resistance of the solid polymer electrolyte composition is small and impractical. As mentioned, the content thereof is 0.01 to 50% in weight based on the weight of the solid polymer electrolyte, and preferably 0.1 to 20%. This is because the effect of improving the specific resistance is not recognized in the range of below 0.01% in weight and over 50% in weight.

In order to incorporate the particles and/or the fibers of such a metal oxide as silica and titania in the solid polymer electrolyte, the particles and/or the fibers of the metal oxide and the solid polymer electrolyte are desirably mixed in the respective suspended or dissolved state in a hydrophilic solvent such as methanol, ethanol, isopropanol and butanol because the specific resistance of the ion exchange membrane is made smaller. The reason thereof is supposed that the particles and/or the fibers of the incorporated oxides may be contained near the cluster structure formed by the ion exchange groups (hydrophilic) of the solid polymer electrolyte by employing the hydrophilic solvent.

Such cation exchange resin as perfluorocarbon sulphonic acid, polysulphone, perfluorocarboxylic acid, styrene-vinyl benzene sulphonic acid and such anion exchange resin as styrene-butadiene based resin may be employed as the solid polymer electrolyte incorporating the particles and/or the fibers of the metal catalyst and the metal oxide. Especially, the perfluorocarbon sulfonic acid (Nafion) is suitable because it has superior chemical resistance and thermal stability.

The, examples of the manufacture of the solid polymer electrolyte composition of the present invention and of the manufacture of a membrane when the composition of the present invention is employed as a solid polymer electrolyte membrane (ion exchange membrane) of a solid polymer electrolyte electrochemical cell will be described.

(A) In case that only metal catalyst is incorporated.

After the above 5% in weight isopropanol solution of the solid polymer electrolyte is introduced into a membrane molding vessel and dried at an ordinary temperature, it is vacuum dried at 60° C. for removing the isopropanol so that the membrane is molded. After the solid polymer electrolyte is dipped in distilled water containing a platinum-amine complex of which an amount is 20 times a theoretical amount assuming that two moles of the ion exchange group in the solid polymer electrolyte are replaced with one mole of the platinum complex followed by agitation at 60° C. for five hours, the platinum complex is replaced with ion exchange group and adsorbed on the solid polymer electrolyte containing silica. After the membrane is washed with distilled water for over four hours, it is dipped in distilled water containing 20 times equivalence of hydrazine followed by agitation at 60° C. for five hours to deposit the platinum particles on the solid polymer electrolyte containing the silica. Then, after the ion exchange group is protonized by means of treatment with 4 molar concentration hydrochloric acid, the membrane is sufficiently washed and dried.

In this manner, the solid polymer electrolyte membrane comprising the solid polymer electrolyte and the metal catalyst highly dispersed therein can be prepared.

(B) In case that metal catalyst and metal oxide are incorporated.

At first, the above 5% in weight isopropanol solution of the solid polymer electrolyte and isopropanol dispersion of particles and/or fibers of 0.01 to 50% in weight of a metal oxide [for example, silica having an average primary particle size of 0.007 μm sold by Nippon Aerosil K.K. (tradename: Aerosil 380) and titania having an average primary particle size of 0.005 μm prepared by hydrolysis of a titanium compound (chemical formula: Ti[OCH(CH$_2$)$_2$]) may be employed] based on the weight of the solid polymer electrolyte (concentration: 5 g/liter) are mixed and sufficiently agitated with an ultrasonic homogenizer. After this solution is flown into a membrane molding vessel and dried at an ordinary temperature, it is vacuum dried at 60° C. for removing the isopropanol so that the membrane is molded. Alternatively, the membrane may be prepared by means of extrusion molding or screen printing.

As an alternative example of the incorporation of the particles and/or the fibers in the solid polymer electrolyte, the particles and/or the fibers may be directly applied to the surface of the solid polymer electrolyte membrane already molded and then the particles and the like are embedded in the surface layer by means of treatment at a high temperature and a high pressure such as hotpressing. In this case, the content of the particles and/or the fibers in the surface layer of the solid polymer electrolyte membrane is controlled to be 0.01 to 50% in weight.

Then, a method of incorporating platinum particles as the metal catalyst in the solid polymer electrolyte membrane containing the metal oxide thus prepared will be described.

After the solid polymer electrolyte membrane containing the metal oxide is dipped in distilled water containing a platinum-amine complex of which an amount is 20 times a theoretical amount assuming that two moles of the ion exchange group in the solid polymer electrolyte are replaced with one mole of the platinum complex followed by agitation at 60° C. for five hours, the platinum complex is replaced with the ion exchange group and adsorbed on the membrane. After the membrane is washed with distilled water for over four hours, it is dipped in distilled water containing 20 times equivalence of hydrazine followed by agitation at 60° C. for five hours to deposit the platinum particles on the solid polymer electrolyte containing the metal oxide. Then, after the ion exchange group is protonized by means of treatment with 4 molar concentration hydrochloric acid, the membrane is sufficiently washed and dried.

In this manner, the solid polymer electrolyte membrane comprising the solid polymer electrolyte and the metal catalyst and the metal oxide highly dispersed therein can be prepared. Alternatively, after the metal catalyst such as platinum is supported on the metal oxide, the said metal oxide may be can be incorporated in the solid polymer electrolyte in accordance with the above procedures.

As mentioned, since the solid polymer electrolyte composition of the present invention possesses the abilities of forming water by itself and of retaining the water so that the ionic conductivity and the effect of depressing the crossover is excellent, the composition is useful as an ion exchange membrane for such an electrochemical cell as an oxygen sensor employing an ion exchange membrane, a water electrolyzing cell and an apparatus for synthesizing acetaldehyde employing an ion exchange membrane in addition as the solid polymer electrolyte fuel cell. When the composition is employed as the solid polymer electrolyte layer of the electrochemical cell comprising an anode, the solid polymer electrolyte layer and a cathode, the composition is preferably molded to a thin membrane layer having a thickness of 0.03 to 2 mm, more preferably 0.05 to 0.1 mm.

EXAMPLES

Although Examples of solid polymer electrolyte composition of the present invention will be described, these Examples do not restrict the present invention.

Example 1

Figure 1:
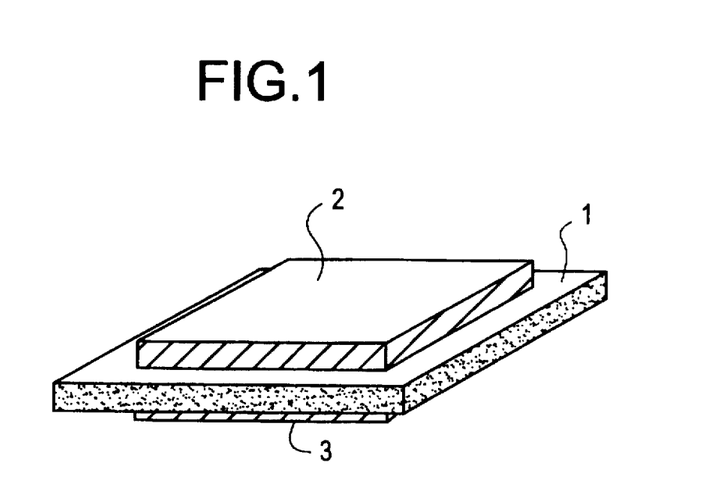
FIG. 1 is a perspective view showing a solid polymer electrolyte electrochemical cell which may include solid polymer electrolyte of the present invention.
Figure 2:
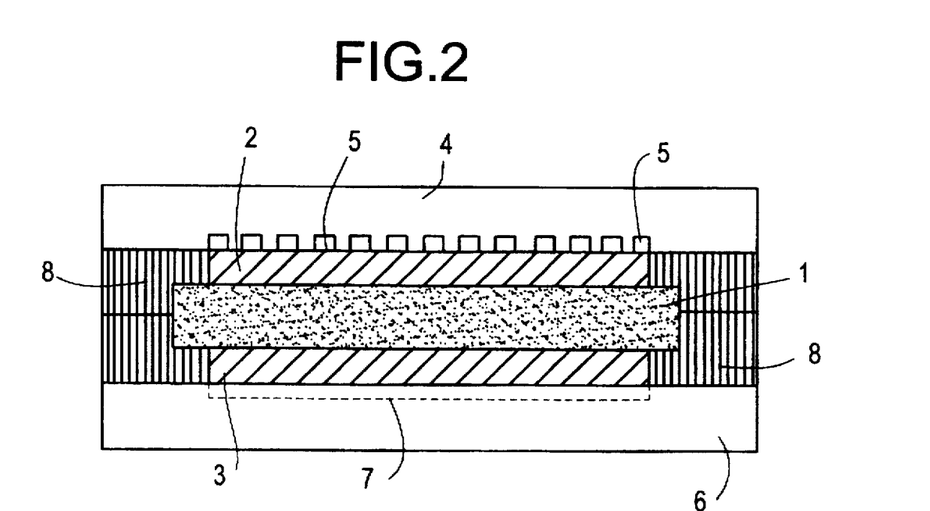
FIG. 2 is a sectional view of a solid polymer electrolyte electrochemical cell assembled as a single cell having a seal structure.

In order to investigate the effect of the incorporation of a catalyst metal, silica and titania in solid polymer electrolyte composition, a solid polymer electrolyte fuel cell was prepared by employing the membrane made by the composition of the present invention as a solid polymer electrolyte membrane and a performance test was conducted under a humidified condition and a non-humidified condition. FIGS. 1 and 2 show the structure of the solid polymer electrolyte fuel cell prepared, and 1 denotes a solid polymer electrolyte membrane (ion exchange membrane), 2 is a cathode catalyst layer, 3 is an anode catalyst layer, 4 is a cathode current collector having supply paths 5 of oxygen, 6 is an anode current collector having supply paths 7 of hydrogen and 8 is sealing members.

The following three membranes were individually prepared and the thickness of all the membrane was adjusted to be 60 μm. The cathode catalyst layer 2, the anode catalyst layer 3, the cathode current collector 4 having supply paths 5 of oxygen, the anode current collector 6 having supply paths 7 of hydrogen and the sealing members 8 were employed in common in the three membranes.

① Cell A . . . The solid polymer electrolyte membrane incorporating the platinum in the Nafion which was prepared in accordance with the above method of manufacturing the membrane (A) was employed. The platinum content in this membrane was adjusted to be 5.8% in weight based on the Nafion.

② Cell B . . . The solid polymer electrolyte membrane incorporating the platinum and the silica in the Nafion which was prepared in accordance with the above method of manufacturing the membrane (B) was employed. The platinum catalyst content and the silica content in this membrane were adjusted to be 5.8% and 5% in weight, respectively, based on the Nafion.

③ Cell C . . . The solid polymer electrolyte membrane incorporating the platinum and the titania in the Nafion which was prepared in accordance with the above method of manufacturing the membrane (B) was employed. The platinum catalyst content and the titania content in this membrane were adjusted to be 5.8% and 5% in weight, respectively, based on the Nafion.

④ Cell D . . . The solid polymer electrolyte membrane composed of only Nafion was employed as Comparative Example.

The operation conditions of the Cells were as follows.

Reaction Gas . . . hydrogen (anode), oxygen (cathode)

Cell Operation Temperature . . . 80° C.

Cell Operation Pressure . . . atmospheric pressure

Other Condition . . . under humidification (indirect humidification employing an anode gas previously humidified at 80° C.) or under non-humidification.

Figure 3:
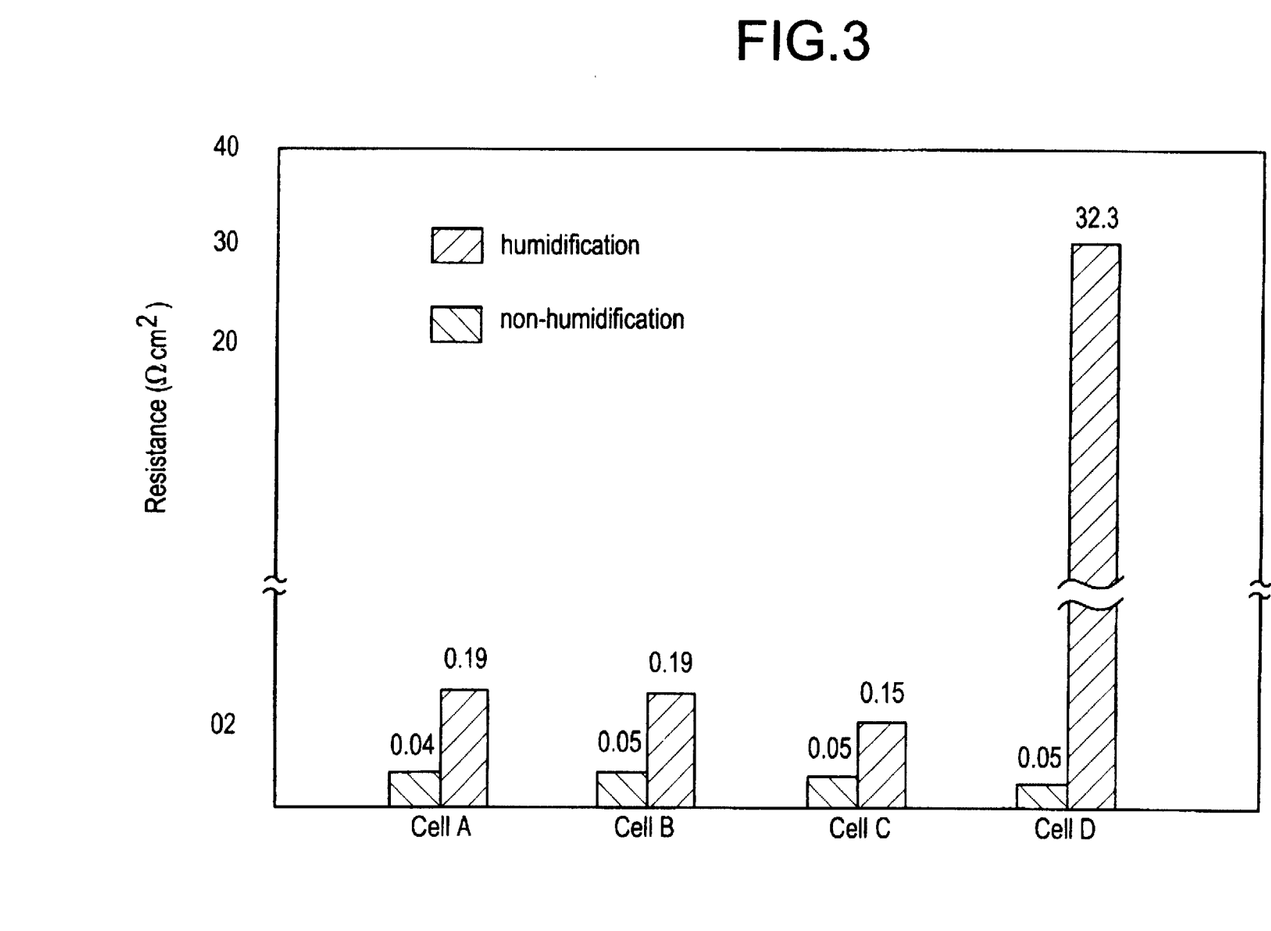
FIG. 3 is a diagram comparing the respective resistance values among Cell A (membrane made by composition of Nafion incorporating platinum was employed), Cell B (membrane made by composition of Nafion incorporating platinum and silica was employed), Cell C (membrane made by composition of Nafion incorporating platinum and titania was employed) and Cell D (membrane made by composition of only Nafion was employed).

The respective resistance values of the Cells A, B, C and D were measured and the results are shown in FIG. 3. The current densities including IR at a cell voltage of 650 mV of the respective Cells under humidified and non-humidified conditions were also measured and the results are shown in FIG. 4.

It is apparent from the results shown in FIG. 3 that the resistance values of the respective Cells under the humidification were nearly the same, and while the value of the Cell D in the non-humidification was 32.3 Ωcm, the other Cells in the non-humidification exhibited an apparently lower values, that is, 0.19 Ωcm for the Cells A and B and 0.15 Ωcm for the Cell C. These lower resistance values are supposed to be obtained by water formed by a crossover hydrogen gas and a crossover oxygen gas flown to the solid polymer electrolyte membrane.

Figure 4:
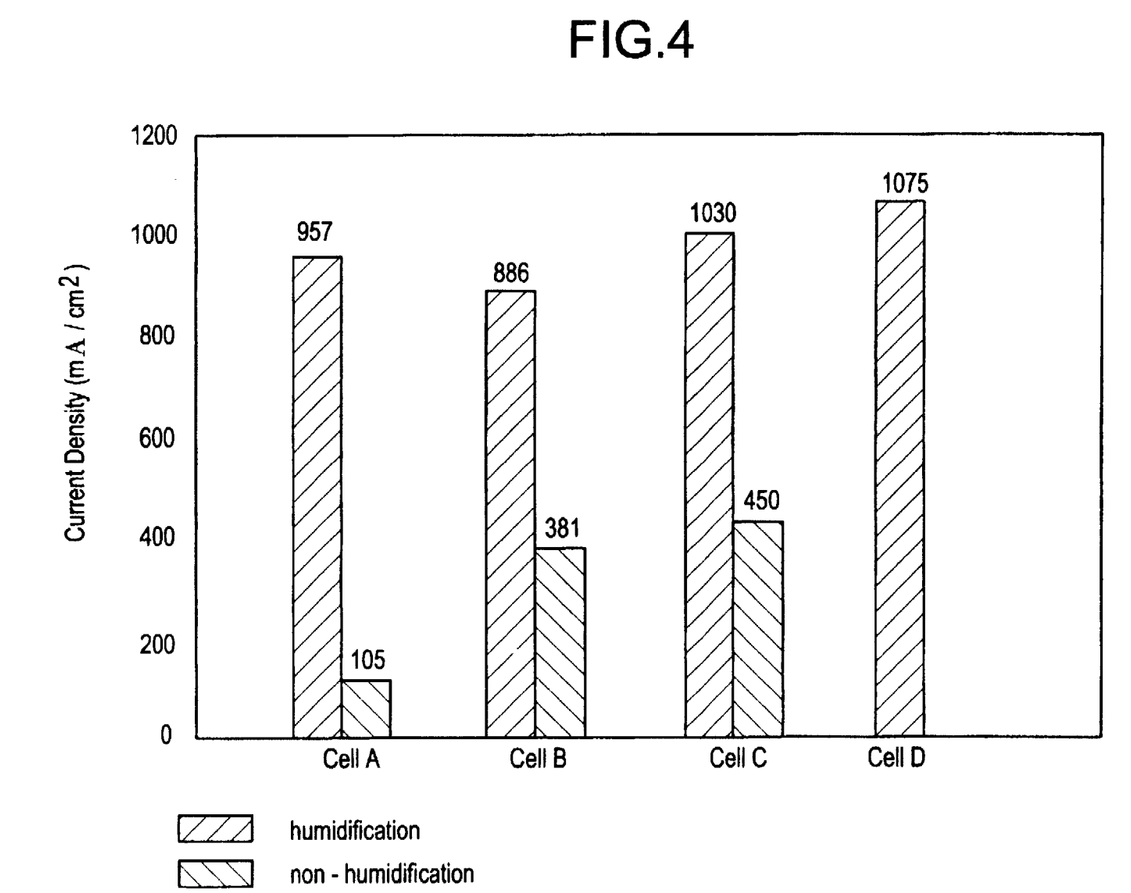
FIG. 4 is a diagram showing comparison of current densities including IR at 650° C. of the respective Cells under humidified and non-humidified operations.

It can be seen from the results of FIG. 4 that under the humidified operation the sufficient performance could be obtained in Cell D.

On the other hand, under the non-humidified operation, the Cell D became inoperative with the cell voltage of $-1$ V after a small amount of current of 6 mA/cm$^2$ was supplied. However, the Cells A, B and C exhibited the current densities of 105 mA/cm$^2$, 381 mA/cm$^2$ and 460 mA/cm$^2$, respectively. Especially, the high current densities of the Cells B and C suggest that the water was formed by the crossover hydrogen gas and the crossover oxygen gas to the solid polymer electrolyte membrane by means of the platinum in the membrane and prevented the drying of the membrane by retaining the water by means of the silica and the titania.

The above results suggest the possibility of the non-humidified operations of the Cells A, B and C though the current densities of the Cells A, B and C under the non-humidified operation were smaller than those of the humidified operation.

Example 2

Figure 5:
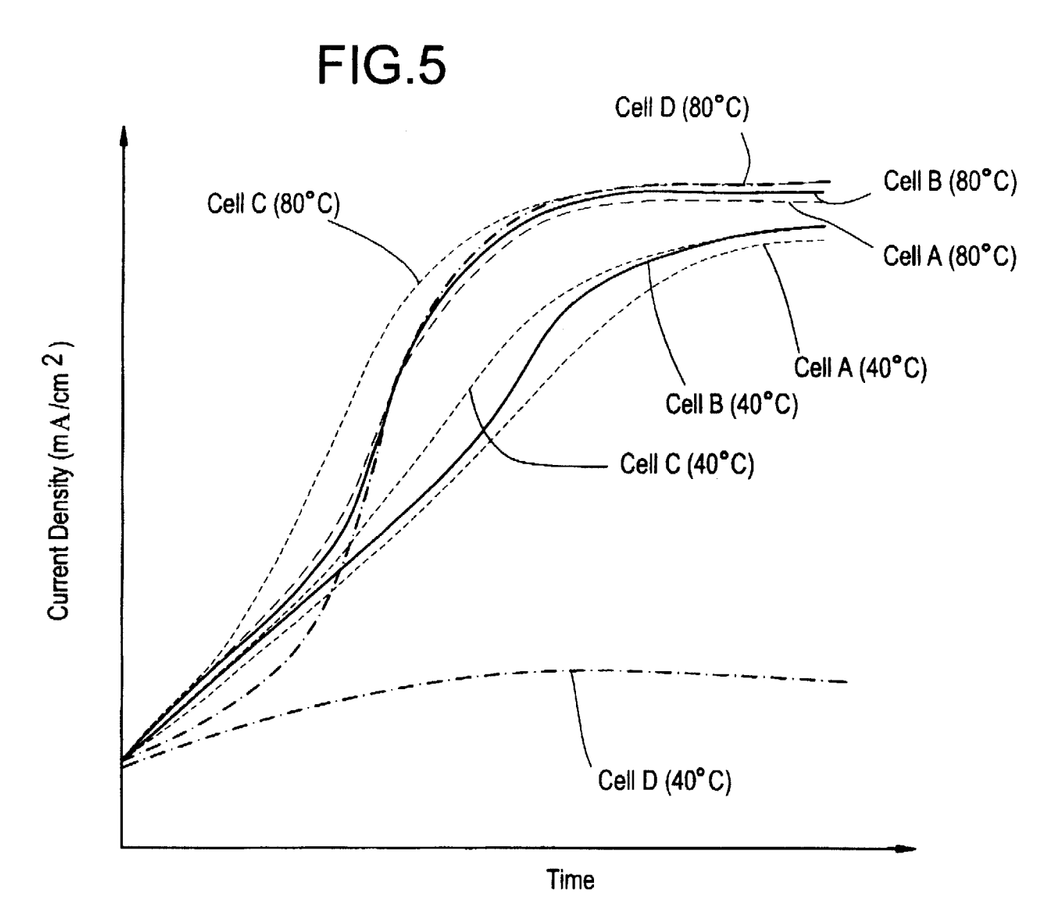
FIG. 5 is a graph showing relation between current densities and operation times at humidification temperatures of 80° C. and 40° C. of the respective Cells.

The relation between the current density and the operation time at humidification temperatures at 80° C. and 40° C. was investigated employing the respective Cells A, B, C and D prepared in Example 1, and the results are shown in FIG. 5. In advance of the investigation, the solid polymer electrolyte membrane was forcibly dried by passing a dry gas through the Cells. This drying was conducted in order to investigate the effect of the incorporation of the metal catalyst, or of the metal catalyst and the silica, or of the metal catalyst and the titania in the solid polymer electrolyte membrane. The operation was conducted at the same temperature as that of the humidification, and the measurement of the current density was initiated at the time of the heating of a humidification pot.

It can be seen from the results shown in FIG. 5 that the Cells A, B, C and D possessed the substantially same characteristic curves under the humidification at 80° C., however in the beginning, more prompt rising of the curves of the Cells A, B and C compared with that of the Cell D was observed. It is considered that even when the temperature of the humidification pot producing the humidification steam was low so that the humidification of the hydrogen gas was insufficient, the ionic conductivity was raised by humidifying the inside of the solid polymer electrolyte membrane for the Cells A, B and C.

On the other hand, under the humidification at 40° C., while the Cell D could take out only a quite small amount of the current density, the Cells A, B and C could take out the current densities as substantially the same as those under the humidification at 80° C. though the rising slopes of the Cells A, B and C tended to be more gradual than those under the humidification at 80° C.

Employing the membrane composed of the solid polymer electrolyte composition of this Example as the solid polymer electrolyte membrane of the solid polymer electrolyte fuel cell, the substantially same current density can be obtained even at a lower humidification temperature or an operation temperature so that the startup time can be reduced because the efficiency of producing the output electricity raises and heating time required to heat the humidification pot and the cell to the operation temperature can be reduced.

Although in this investigation the solid polymer electrolyte membrane was forcibly dried by passing the dry gas through the respective Cells prior to the investigation for apparently investigating the effect of incorporating the metal catalyst or the metal catalyst and the silica or the metal catalyst and the titania in the membrane, small amounts of a hydrogen gas and an oxygen gas, in the actual operation, may be flown to the membrane at the time of the suspension of the operation. Since, in this manner, water is produced by means of the metal catalyst in the membrane and the membrane is never dried even at the suspension of the operation, the more rapid rising of the current density at the initial operation can be obtained.

Example 3

The results shown in FIGS. 6–10 were obtained in accordance with the following experimental procedures. All PEMs (thickness of 50 µm) were prepared by casting from a Nafion solution. TiO$_2$ (Aerosol 25) or TiO$_3$ colloid prepared by the hydrolysis of titanium tetraisopropoxide ("TIP") or SiO$_2$ (Aerosol 300) was used as the water-absorbing material. The nanocrystalline oxide was added to the Nafion solution (3 wt. % to Dried Nafion), followed by casting, to form the oxide-incorporated PEM. These PEMs are denoted as TiO$_2$(P25)-PEM, TiO$_2$(TIP)-PEM or SiO$_2$-PEM while a PEM containing no additives is denoted as a normal PEM.

Platinum nanocrystallites were subsequently dispersed in the PEMs by cationic exchange treatment with a [Pt(NH$_2$)$_4$]Cl$_{35}$ solution at 60° C. for an overnight period of time, followed by reduction of the exchanged Pt$^{2+}$ with hydrazine. The amount of Pt in the film, as determined by ICP spectrometry was about 0.07 mg/cm$^2$. The resultant PEMs were then protonated by an acid treatment and are denoted as Pt-PEM, Pt-TiO$_2$(P25)-PEM, Pt-TiO$_2$(TIP)-PEM and Pt-SiO$_2$-PEM. The distribution of nanocrystalline Pt and/or oxides was observed by a transmission electron microscope (TEM: JEM-200FX, JEOL) with an energy dispersive X-ray spectrometer (EDS: NORAN).

A small sample for the TEM observation was sliced from the PEM by a cutting knife and was placed on a carbon-evaporated Cu microgrid with a drop of 2-propanol. The water-absorbing ability of the PEMs was evaluated by the weight change occurring in the dried films after they were equilibrated with water vapor at 60° C. These evaluations typically took a few hours.

The anode and cathode employed in the PEFCs were similar to those used in a conventional phosphoric acid fuel cell. They contained 0.7 mg/cm² of Pt catalyst supported on carbon black having a particle diameter of 40 µm. The electrode attached to each PEM prepared ad described above were then assembled into a test cell housing of circular shape as described in *J. Electrochem. Soc.*, 140, 8191 (1993). All cells were operated with wet or dry $H_2$ as the fuel and dry $O_2$ as the oxidant at 80° C. under ambient pressure following the procedure set forth below.

Initially, all cells were operated with externally-humidified hydrogen gas saturated with water at a humidification temperature $(T_n)$ of 90° C.; the partial pressure of water vapor in the inlet anode gas was 0.692 atm. After the cells were dried overnight with a flow of dry $N_2$, they were operated with dry $H_2$ and $O_2$. Finally, they were operated with humidified $H_2$ at $T_a=20°$ C. and dried $O_2$. Since the partial pressure of water vapor at 20° C. is only 0.023 atm., the humidification at $T_a=20°$ C. is denoted herein as slight humidification.

Under the different modes as described above, steady-state current voltage (I-E) curves and resistance of the PEMs were measured with a current interrupter (NCPG, Nikko Keisoku), applying current off-pulses for 100 µs and recording the resultant potentials with a storage oscilloscope (Hitachi VC 6023). Potentials of the anode and the cathode were also measured against a dynamic hydrogen reference electrodes. The cells employing normal-PEM and oxide-PEMs did not have a stable voltage for a given current density without external humidification. The resistance of these cells under non-humidified conditions were measured by applying current-on pulses for 100 µs. All the I-E curves for the cells shown in FIGS. 6–10 include IR-drops in the PEMs.

Figure 6:
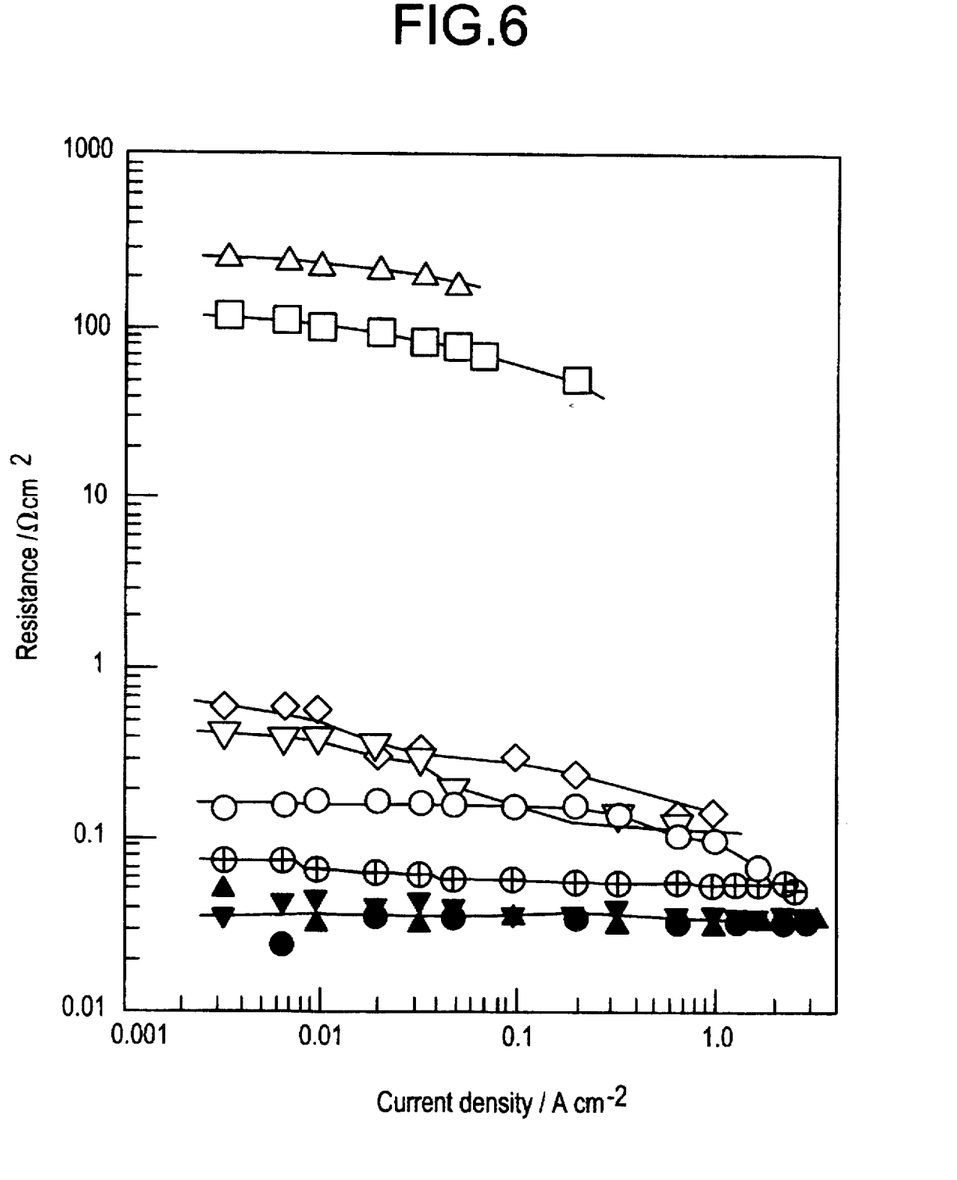
Figure 7:
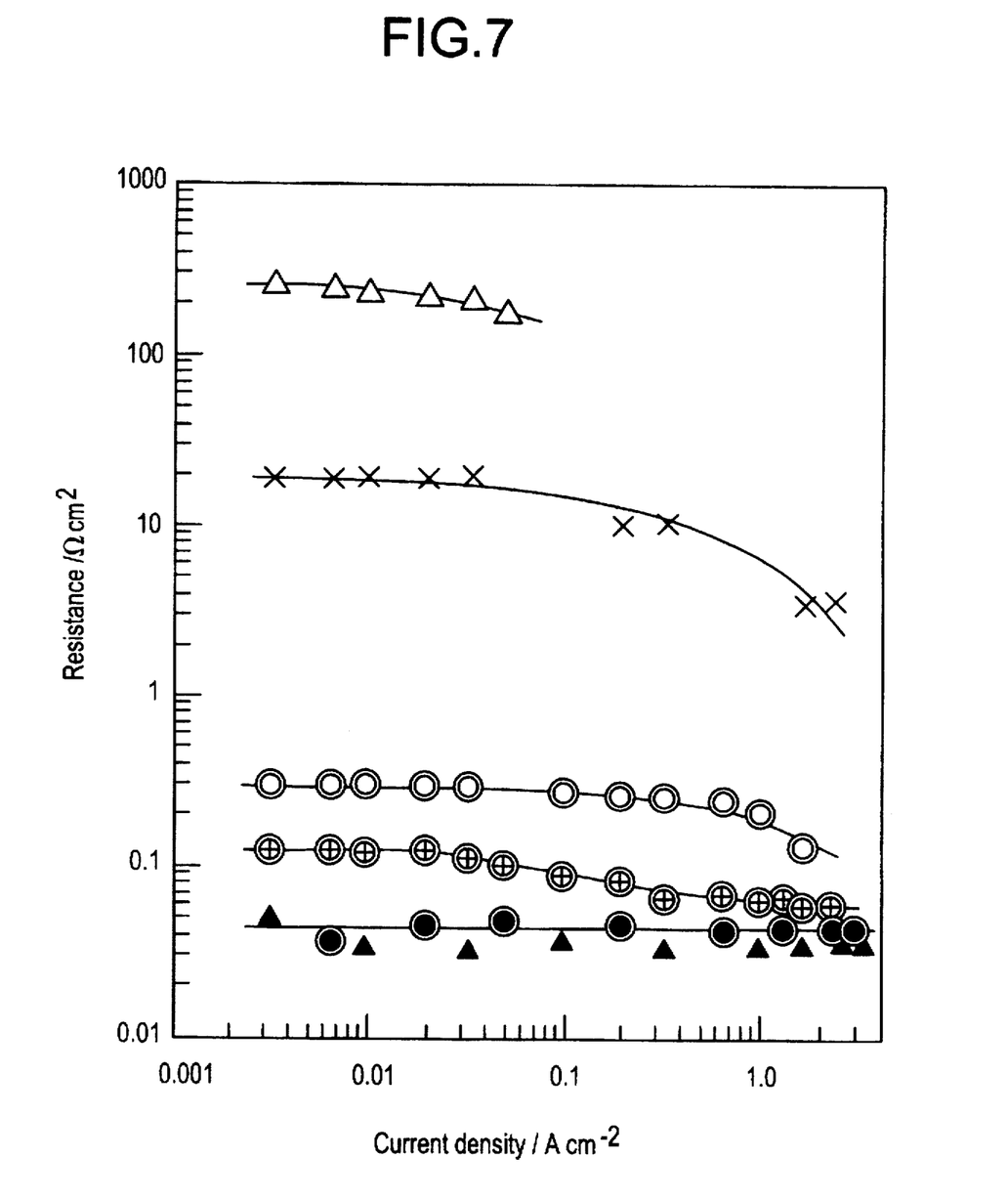
FIG. 7 is a graph which compares the resistances of various PEMs in PEFCs operated at 80° C. without any humidification (shown by the symbols $\triangle$, $\square$, $\mathbf{o}$) and with external humidification (shown by the symbols $\oplus$ at $T_n=20°$ C.; $\blacktriangle$, $\mathbf{o}$ at $T_n=90°$ C.). Gas flow rates were controlled as set forth in respect to FIG. 6. The symbols $\triangle$, $\blacktriangle$ represent a normal-PEM; x represents a $SiO_2$-PEM; $\mathbf{o}$, $\oplus$, $\bullet$ represent a Pt-$SiO_2$-PEM.
Figure 9:
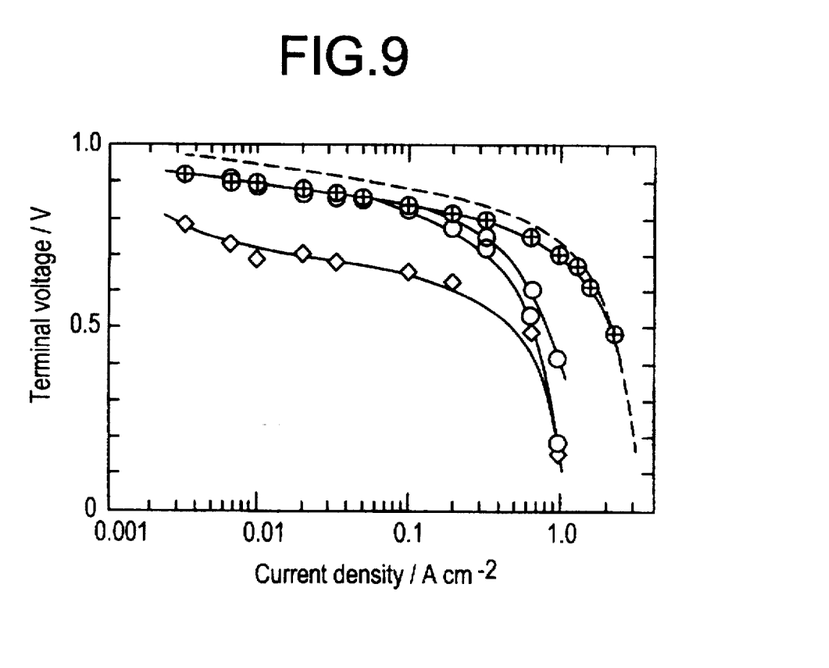
FIG. 9 represents plots of terminal voltage v. current density for PEFCs with Pt-PEM ($\diamond$), Pt-$SiO_2$-PEM ($\mathbf{o}$) or Pt-$TiO_2$(TIP)-PEM ($\circ$, $\oplus$) operated at 80° C. without humidification ($\diamond$, $\mathbf{o}$, $\circ$) or with humidified $H_2$ at $T_n=20°$ C. $\oplus$. Gas flow rates were controlled as set forth in FIG. 6. The dotted lines represent externally humidified ($T_n=90°$ C.) normal-PEM or Pt-$TiO_2$(TIP)-PEM as previously referred to in respect to FIG. 8.

As may be seen from FIGS. 6, 7 and 9, the additives mentioned above had dramatic effects on both the resistance of the PEMs and the resulting cell performances when the cells were operated without any external humidification, i.e. operating with dry $H_2$ and $O_2$ after the cells were dried overnight with $N_2$. The resistances of the various PEMs are shown in FIG. 6 as a function of steady state densities at $T_{cell}=80°$ C. under dry-$H_2$ feed conditions. As is clearly shown in FIG. 6, the addition of fine $TiO_2$ particles to the Pt-PEM, i.e. $TiO_2$(TIP)-PEM, resulted in a significant reduction of the resistance due to the hygroscopic property of the oxide particles in the PEM. Such resistance is less than 0.17 Ωcm² (34 Ωcm) even for small current densities, and it decreased with increasing current density, finally to a value of less than 0.07 Ωcm². When H2 was humidified with water at $T_h=20°$ C., the resistance of the Pt-$TiO_2$(TIP)-PEM was lowered further to about 0.06 Ωcm² (12 Ωcm) over the entire current density range in spite of the fact that humidification occurred by mere traces of water. This resistance is close to those of externally humidified PEMs at $T_n=90°$ C. where the resistances of all PEMs coincided with a minimum value of about 0.035 Ωcm² (7 Ωcm) over the entire practical current density region.

A similar effect on the resistance in the PEMs was obtained with platinum and $SiO_2$ as shown in FIG. 7. $SiO_2$-PEM exhibited a resistance one order of magnitude smaller than normal-PEM presumably because the $SiO_2$ particles adsorbed the water produced from the crossed-over $H_2$ and $O_2$ at the anode of cathode. The presence of Pt particles further reduced the resistance by two orders of magnitude, i.e. 0.3 Ωcm² or less. When the PEM was humidified at $T_n=20°$ C., the resistance could be lowered to a value of less than 0.1 Ωcm² and values of less than 0.07 Ωcm² were achieved at high current densities.

Figure 8A:
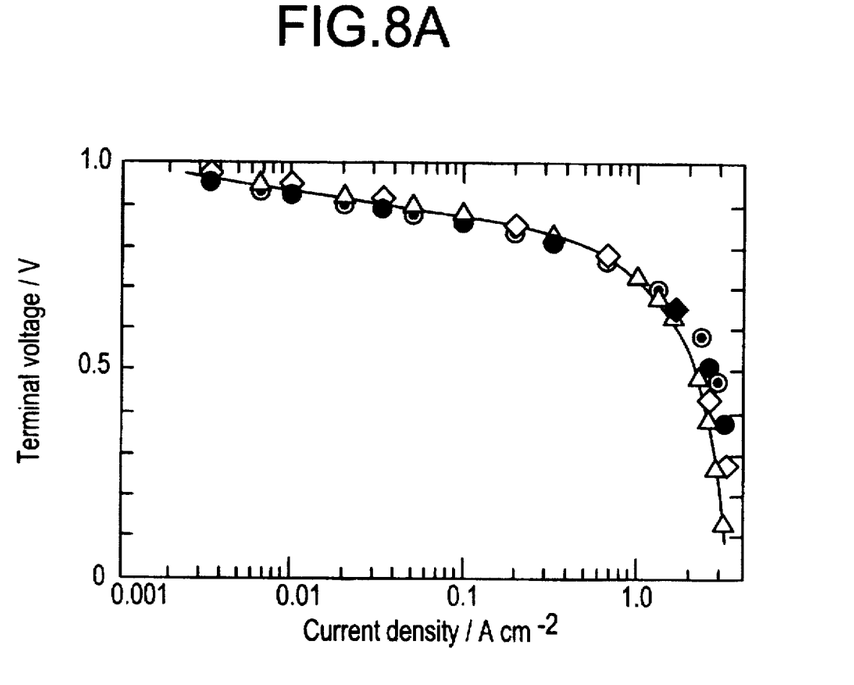
FIG. 8 represents plots of terminal voltage v. current density of PEFCs with various PEMs operated at 80° C. under externally humidified conditions ($T_n=90°$ C.). Gas flow rates: $H_2=450$ ml/min, $O_2=200$ ml/min. The symbol $\triangle$ represents a normal-PEM; $\diamond$ represents a Pt-PEM; $\bullet$ represents a Pt-$TiO_2$(TIP)-PEM; $\bullet$ represents a Pt-$SiO_2$-PEM. The inset shows a comparison of current densities at a terminal voltage of 0.7 V for various PEMs.
Figure 8B:
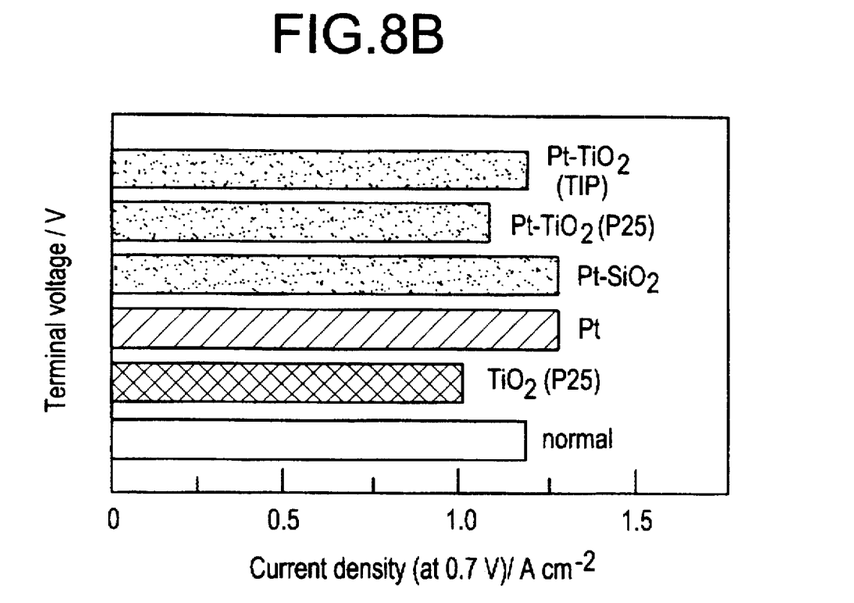

FIG. 8 shows I-E curves of PEFCs with various PEMs under externally humidified conditions $(T_h=90°$ C.). The cell with normal-PEM showed very high performance, e.g. about 1.2 A/cm² at a terminal voltage of 0.70 V (i.e. 0.84 W/cm²). Almost the same performance was obtained over the entire current density region for cells using PEMs with incorporated Pt and/or oxides. Some I-E curves are not shown in FIG. 8 to avoid crowding, but the current densities at 0.70 V are shown as an inset in FIG. 8. $TiO_2$(TIP)-PEM or Pt-$TiO_2$(P25)-PEM showed relatively low performance.

FIG. 9 shows the performances of cells using the PEMs of the invention at $T_{cell}=80°$ C. with dry $H_2$ and $O_2$. The cells using normal-PEM or the PEMs with dispersed oxides alone, e.g. $TiO_2$(TIP)-PEM had open cell voltage ("OCVs") of 0.85 V and 0.94 V, but their stability was found to be poor due to the large resistance as discussed above. Pt-PEM yielded the same OCV as $TiO_2$(TIP)-PEM and had stable performance due to its relatively small resistance when humidified with water produced by the recombination of crossover gases. However, the polarization was found to be fairly large with a small limiting current density on the order of 1 A/cm². This limiting current density is one third of the value obtained for cells sufficiently humidified externally, as shown by the dotted line in FIG. 9. Significant improvements of 0.2V or more in the polarization were observed as the result of the addition of $TiO_2$(TIP) or $SiO_2$ to the Pt-PEM, i.e. Pt-$TiO_2$(TIP)-PEM or Pt-$SiO_2$-PEM, although the limiting current density was not pronounced. It was found that the limiting current densities could be drastically improved by humidification of the $H_2$ feed at $T_h=20°$ C. (vapor pressure=0.023 atm.). The value of voltage and limiting current were found to be close to those observed for fully humidified cells, as shown in FIG. 9.

Figure 10:
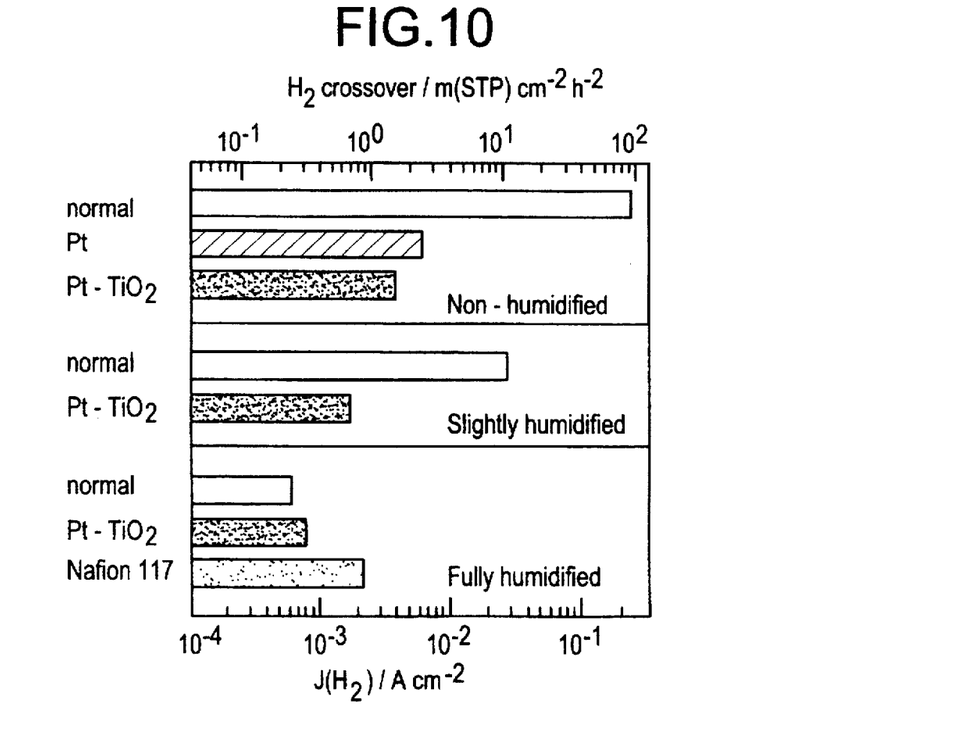
FIG. 10 is a graph which compares the current densities for the oxidation of crossover $H_2$, J($H_2$), for various PEMs' in PEFCs operated at 80° C. with the reactant gases humidified under different conditions; non-humidified—dry $H_2$/dry $O_2$; slightly humidified—wet $H_2$ ($T_n=20°$ C.)/dry $O_2$; fully humidified—wet $H_2$ ($T_h=90°$ C.)/dry $O_2$. The crossover loss of hydrogen (expressed in units of ml(STP) $cm^{-2}h^{-1}$) is also indicated on the upper axis. The value for Nafion 117 is calculated based on the diffusion parameters which appears in *J. Electroanal. Chem.*, 357, 201 (1993); the thickness was 50 μm, $T_{cell}=80°$ C., wet $H_2$/wet $O_2$, $T_h=80°$ C. for both gases.

The PEFC with the Pt-$TiO_2$(TIP)-PEM of the invention showed exceptionally high performance yielding 0.63 W/cm² at 0.90 A/cm² and 0.70 V, corresponding to a 60% energy conversion efficiency calculated by the ratio of 0.70 V (practical cell voltage)/1.23 V (theoretical cell voltage). In the region of 0.60–0.40 V, current densities of 1.7–2.5 A/cm² were observed leading to an output of about 1 W/cm², when slightly humidified $H_2$ at 20° C. was used. Such performance is clearly comparable to that of conventional cells using full humidification at 90°–105° C. Moreover, PEFCs containing the PEMs of the invention were capable of cold-starting with totally dry reactant gases. Accordingly, the PEFCs and the PEFCs of the invention are distinctly superior to conventional PEFCs, particularly for their quick response and simplicity of the overall cell system. The effect of Pt dispersion in PEMs on the prevention of $H_2$ crossover is clearly demonstrated, particularly under the operation with dry reactant gases, as shown in FIG. 10.

What is claimed is:

1. Solid polymer electrolyte composition comprising solid polymer electrolyte selected from cation exchange resin and anion exchange resin, and 0.01 to 80% in weight of at least one metal catalyst selected from the group consisting of platinum, gold, palladium, rhodium, iridium and ruthenium based on the weight of the solid polymer electrolyte contained in the said solid polymer electrolyte.

2. Solid polymer electrolyte composition comprising solid polymer electrolyte selected from cation exchange resin and anion exchange resin, 0.01 to 80% in weight of at least one metal catalyst selected from the group consisting of platinum, gold, palladium, rhodium, iridium and ruthenium based on the weight of the solid polymer electrolyte contained in the said solid polymer electrolyte, and 0.01 to 50% weight of particles and/or fibers of one or more metal oxides contained in the solid polymer electrolyte.

3. Solid polymer electrolyte composition as claimed in claim 2, wherein the metal oxide is selected from the group consisting of silica, titania, alumina, zirconia, magnesia and stannic oxide.

4. Solid polymer electrolyte composition as claimed in claim 2, wherein the metal oxide is silica or titania.

5. Solid polymer electrolyte composition as claimed in claim 2, wherein the cation exchange resin is selected from the group consisting of perfluorocarbon sulphonic acid, polysulphone, perfluorocarboxylic acid and styrene-vinyl benzene sulphonic acid.

6. Solid polymer electrolyte composition as claimed in claim 2, wherein the anion exchange resin is styrene-butadiene based anion exchange resin.

7. Solid polymer electrolyte composition as claimed in claim 2, wherein the average particle size of the metal oxide is not more than 0.1 μm.

8. Solid polymer electrolyte composition as claimed in claim 2, wherein the average primary particle size of the particles of the metal oxide is not more than 0.1 μm, and the diameter of the fibers of the metal oxide is not more than 6 μm.

9. A solid polymer electrolyte fuel cell comprising a cathode current collector, a cathode catalyst layer, a solid polymer electrolyte membrane, an anode catalyst layer and an anode current collector piled in this turn in which an oxidative gas or liquid is supplied to the cathode catalyst layer and a fuel gas or liquid is supplied to the anode catalyst layer characterized in that solid polymer electrolyte composition comprising solid polymer electrolyte selected from cation exchange resin and anion exchange resin, and 0.01 to 80% in weight of at least one metal catalyst selected from the group consisting of platinum, gold, palladium, rhodium, iridium and ruthenium based on the weight of the solid polymer electrolyte contained in the said solid polymer electrolyte is employed as the above solid polymer electrolyte membrane.

10. A solid polymer electrolyte fuel cell comprising a cathode current collector, a cathode catalyst layer, a solid polymer electrolyte membrane, an anode catalyst layer and an anode current collector piled in this turn in which an oxidative gas or liquid is supplied to the cathode catalyst layer and a fuel gas or liquid is supplied to the anode catalyst layer characterized in that solid polymer electrolyte composition comprising solid polymer electrolyte selected from cation exchange resin and anion exchange resin, 0.01 to 80% in weight of at least one metal catalyst selected from the group consisting of platinum, gold, palladium, rhodium, iridium and ruthenium based on the weight of the solid polymer electrolyte, and 0.01 to 50% in weight of particulate silica and/or fabulous silica fibers based on the weight of the solid polymer electrolyte contained in the said solid polymer electrolyte is employed as the above solid polymer electrolyte membrane.

* * * * *